US012764303B2

(12) United States Patent
Gu et al.

(10) Patent No.: US 12,764,303 B2
(45) **Date of Patent: *Oct. 13, 2026**

(54) RATE CONTROL MACHINE LEARNING MODELS WITH FEEDBACK CONTROL FOR VIDEO ENCODING

(71) Applicant: GDM Holding LLC, Mountain View, CA (US)

(72) Inventors: Chenjie Gu, Sunnyvale, CA (US); Hongzi Mao, Newtown Square, PA (US); Ching-Han Chiang, Santa Clara, CA (US); Cheng Chen, Milpitas, CA (US); Jingning Han, Los Altos, CA (US); Ching Yin Derek Pang, San Jose, CA (US); Rene Andre Claus, Fremont, CA (US); Marisabel Guevara Hechtman, Miami, FL (US); Daniel James Visentin, London (GB); Christopher Sigurd Fougner, Küsnacht (CH); Charles Booth Schaff, Chicago, IL (US); Nishant Patil, Mountain View, CA (US); Alejandro Ramirez Bellido, Sant Just Desvern (ES)

(73) Assignee: GDM Holding LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,975

(22) Filed: Aug. 1, 2024

(65) Prior Publication Data

US 2024/0397055 A1 Nov. 28, 2024

Related U.S. Application Data

(63) Continuation of application No. 18/030,182, filed as application No. PCT/EP2021/080508 on Nov. 3, 2021, now Pat. No. 12,088,823.

(Continued)

(51) Int. Cl.
*H04N 7/12* (2006.01)
*H04N 19/126* (2014.01)
(Continued)

(52) U.S. Cl.
CPC ......... *H04N 19/149* (2014.11); *H04N 19/126* (2014.11); *H04N 19/172* (2014.11)

(58) Field of Classification Search
CPC .. H04N 19/149; H04N 19/126; H04N 19/172; H04N 19/147; H04N 19/15; H04N 19/179; H04N 19/194
See application file for complete search history.

(56) References Cited

U.S. PATENT DOCUMENTS

| | | | |
|---|---|---|---|
| 7,606,427 | B2 | 10/2009 | Malayath et al. |
| 11,775,800 | B2 | 10/2023 | Aizawa |

(Continued)

FOREIGN PATENT DOCUMENTS

| | | | |
|---|---|---|---|
| CN | 111050169 | A | 4/2020 |
| CN | 111294595 | A | 6/2020 |

(Continued)

OTHER PUBLICATIONS

Office Action in Chinese Appln. No. 2021800676667, mailed on Jun. 19, 2025, 14 pages (with English translation).

(Continued)

*Primary Examiner* — Gims S Philippe
(74) *Attorney, Agent, or Firm* — Fish & Richardson P.C.

(57) ABSTRACT

Methods, systems, and apparatus, including computer programs encoded on a computer storage medium, for encoding video comprising a sequence of video frames. In one aspect, a method comprises for one or more of the video frames: obtaining a feature embedding for the video frame; processing the feature embedding using a rate control machine learning model to generate a respective score for each of (Continued)

multiple quantization parameter values; selecting a quantization parameter value using the scores; determining a cumulative amount of data required to represent: (i) an encoded representation of the video frame and (ii) encoded representations of each preceding video frame; determining, based on the cumulative amount of data, that a feedback control criterion for the video frame is satisfied; updating the selected quantization parameter value; and processing the video frame using an encoding model to generate the encoded representation of the video frame.

20 Claims, 7 Drawing Sheets

Related U.S. Application Data

(60) Provisional application No. 63/109,270, filed on Nov. 3, 2020.

(51) Int. Cl.
*H04N 19/149* (2014.01)
*H04N 19/172* (2014.01)

(56) References Cited

U.S. PATENT DOCUMENTS

| | | | |
|---|---|---|---|
| 2007/0025441 A1 | 2/2007 | Ugur et al. | |
| 2010/0266047 A1 | 10/2010 | Takahashi et al. | |
| 2019/0132591 A1* | 5/2019 | Zhang | H04N 19/124 |
| 2019/0341025 A1 | 11/2019 | Omote | |
| 2019/0394466 A1 | 12/2019 | Gao et al. | |
| 2020/0186808 A1 | 6/2020 | Joshi et al. | |
| 2020/0322703 A1* | 10/2020 | Bures | G06F 16/27 |
| 2021/0076016 A1* | 3/2021 | Sviridenko | H04L 65/756 |
| 2021/0117948 A1 | 4/2021 | Voss | |
| 2021/0201434 A1* | 7/2021 | Wang | G06F 9/3885 |
| 2021/0209388 A1 | 7/2021 | Ciftci | |
| 2022/0030244 A1* | 1/2022 | Su | G06N 20/00 |
| 2023/0344705 A1 | 10/2023 | Amini | |

FOREIGN PATENT DOCUMENTS

| | | |
|---|---|---|
| EP | 1102492 | 5/2001 |
| IN | IN2007DELNP10188 A1 | 6/2008 |

OTHER PUBLICATIONS

Abbeel et al., "An application of reinforcement learning to aerobatic helicopter flight," Proceedings of the 19th International Conference on Neural Information Processing Systems, Dec. 2006, 1-8.
Addanki et al., "Placeto: Learning generalizable device placement algorithms for distributed machine learning," Proceedings of the 33rd International Conference on Neural Information Processing Systems, Dec. 2019, 3981-3991.
Agustsson et al., "Scale-space flow for end-to-end optimized video compression," Proceedings of the IEEE/CVF Conference on Computer Vision and Pattern Recognition, Jun. 13-19, 2020, 8503-8512.
Andrychowicz et al., "Hindsight experience replay," Proceedings of the 31st International Conference on Neural Information Processing Systems, Dec. 2017, 5055-5065.
Beyer et al., "Evolution strategies-a comprehensive introduction," Natural computing, Mar. 2002, 1(1):3-52.
Bjontegaard, "Calculation of average PSNR differences between RD-curves," ITU—Telecommunications Standardization Sector Video Coding Experts Group (VCEG) Thirteenth Meeting, VCEG-M33, Austin, Texas, USA, Apr. 2-4, 2001, 4 pages.
Bojarski et al., "End to end learning for self-driving cars," CoRR, submitted on Apr. 25, 2016, arXiv:1604.07316v1, 9 pages.
Chiang et al., "A new rate control scheme using quadratic rate distortion model," Proceedings of 3rd IEEE International Conference on Image Processing, Sep. 19, 1996, 2:73-76.
Cisco, "Cisco annual internet report (2018-2023) white paper," Cisco: San Jose, CA, USA, Mar. 2020, 35 pages.
Djelouah et al., "Neural inter-frame compression for video coding," Proceedings of the IEEE International Conference on Computer Vision (ICCV), Oct. 27-Nov. 2, 2019, 6421-6429.
ffmpeg.org, [online] "Ffmpeg and vp9 encoding guide," Jan. 8, 2024, retrieved on Jan. 14, 2024, retrieved from URL <https://trac.ffmpeg.org/wiki/Encode/VP9>, 5 pages.
Finn et al., "One-shot visual imitation learning via meta-learning," CoRR, submitted on Sep. 14, 2017, arXiv:1709.04905v1, 12 pages.
Gao et al., "SSIM-based game theory approach for rate-distortion optimized intra frame CTU-level bit allocation," IEEE Transactions on Multimedia, Jun. 2016, 18(6):988-999.
Golovin et al., "Google vizier: A service for black-box optimization," Proceedings of the 23rd ACM SIGKDD international conference on knowledge discovery and data mining, Aug. 13-17, 2017, 1487-1495.
Habibian et al., "Video Compression With Rate-Distortion Autoencoderss," Proceeding of 2019 IEEE/CVF International Conference on Computer Vision (ICCV), Oct. 27-Nov. 2, 2019, 7033-7042.
He et al., "Optimum bit allocation and accurate rate control for video coding via p-domain source modeling," IEEE transactions on Circuits and Systems for Video Technology, Oct. 2002, 12(10):840-849.
Hu et al., "Reinforcement learning for HEVC/H.265 intra-frame rate control," 2018 IEEE International Symposium on Circuits and Systems (ISCAS), May 27-30, 2018, 1-5.
Hussein et al., "Imitation learning: A survey of learning methods," ACM Computing Surveys (CSUR), Apr. 2017, 50(2):1-35.
International Search Report and Written Opinion in International Appln. No. PCT/EP2021/080508, mailed on Feb. 2, 2022, 19 pages.
Jay et al., "A deep reinforcement learning perspective on internet congestion control," Proceedings of the 36th International Conference on Machine Learning (PMLR), May 24, 2019, 3050-3059.
Jiang et al., "On enhancing h.264/avc video rate control by psnr-based frame complexity estimation," IEEE Transactions on Consumer Electronics, Feb. 2005, 51(1):281-286.
Kwon et al., "Rate control for H.264 video with enhanced rate and distortion models," IEEE Transactions on Circuits and Systems for Video Technology, May 2007, 17(5):517-529.
Li et al., "Toward A Practical Perceptual Video Quality Metric," Netflix Technology Blog, Jun. 6, 2016, retrieved from URL <https://netflixtechblog.com/toward-a-practicalperceptual-video-quality-metric-653f208b9652>, 30 pages.
Li et al., "λ domain rate control algorithm for high efficiency video coding," IEEE transactions on Image Processing, Sep. 2014, 23(9):3841-3854.
Lu et al., "DVC: An end-to-end deep video compression framework," Proceedings of the IEEE/CVF Conference on Computer Vision and Pattern Recognition (CVPR), Jun. 16-20, 2019, 11006-11015.
Ma et al., "Rate-distortion analysis for h.264/avc video coding and its application to rate control," IEEE Transactions on Circuits and Systems for Video Technology, Dec. 5, 2005, 15(12):1533-1544.
Mao et al., "Learning scheduling algorithms for data processing clusters," Proceedings of the ACM Special Interest Group on Data Communication, Aug. 2019, 270-288.
Mao et al., "Neural adaptive video streaming with pensieve," Proceedings of the Conference of the ACM Special Interest Group on Data Communication, Aug. 2017, 197-210.
Mirhoseini et al., "A hierarchical model for device placement," International Conference on Learning Representations, Feb. 15, 2018, 11 pages.
Mirhoseini et al., "Device placement optimization with reinforcement learning," Proceedings of the 34th International Conference on Machine Learning (PMLR), Aug. 2017, 70:2430-2439.
Mnih et al., "Asynchronous methods for deep reinforcement learning," Proceedings of The 33rd International Conference on Machine Learning, (PMLR), Jun. 11, 2016, 48:1928-1937.

(56) References Cited

OTHER PUBLICATIONS

Mnih et al., "Human-level control through deep reinforcement learning," Nature, Feb. 2015, 518:529-533.
Mukherjee et al., "A technical overview of VP9—The latest open-source video codec," SMPTE Motion Imaging Journal, Jan. 2015, 124(1):44-54.
Nvidia.com [online], "Nvidia tensor cores," available on or before Dec. 20, 2018, via Internet Archive: Wayback Machine URL <https://web.archive.org/web/20181220144027/https://www.nvidia.com/en-us/data-center/tensorcore/>, retrieved on Jan. 29, 2024, URL <https://www.nvidia.com/en-us/data-center/tensorcore/>, 5 pages.
Rippel et al., "Learned video compression," Proceedings of the IEEE/CVF International Conference on Computer Vision (ICCV), Oct. 27-Nov. 2, 2019, 3454-3463.
Salimans et al., "Evolution Strategies as a Scalable Alternative to Reinforcement Learning," CoRR, submitted on Sep. 7, 2017, arXiv:1703.03864v2, 13 pages.
Sanz-Rodriguez et al., "Rbf-based qp estimation model for vbr control in h.264/svc," IEEE Transactions on Circuits and Systems for Video Technology, Sep. 2011, 21(9):1263-1277.
Silver et al., "Mastering the game of go with deep neural networks and tree search," Nature, Jan. 2016, 529(7587):484-489.
Sullivan et al., "Rate-distortion optimization for video compression," IEEE signal processing magazine, Nov. 1998, 15(6):74-90.
Tian et al., "Elf: An extensive, lightweight and flexible research platform for real-time strategy games," Proceedings of the 31st International Conference on Neural Information Processing Systems, Dec. 2017, 2656-2666.
Vaswani et al., "Attention is all you need," CoRR, submitted on Dec. 6, 2017, arXiv:1706.03762v5, 15 pages.
Wang et al., "Image quality assessment: from error visibility to structural similarity," Proceeding of the IEEE transactions on image processing, Apr. 13, 2004, 13(4):600-612.
Wen et al., "Trellis-based r-d optimal quantization in H.263+," IEEE Transactions on Image Processing, Aug. 2000, 9(8):1431-1434.
Wu et al., "Video compression through image interpolation," Proceedings of the European Conference on Computer Vision (ECCV), Sep. 2018, 416-431.
Yeo et al., "Neural Adaptive Content-aware Internet Video Delivery," Proceedings of the 13th USENIX Symposium on Operating Systems Design and Implementation (OSDI '18), Oct. 8-10, 2018, 645-661.
Zhang et al., "A long-short term memory neural network based rate control method for video coding," Proceedings of the 2018 2nd International Conference on Video and Image Processing, Dec. 29, 2018, 155-160.
Zhou et al., "Rate control method based on deep reinforcement learning for dynamic video sequences in HEVC," IEEE Transactions on Multimedia, May 6, 2020, 23:1106-1121.
Office Action in European Appln. No. 21 806 185.1, mailed on Jul. 30, 2025, 7 pages.
Notice of Allowance in Chinese Appln. No. 202180067666.7, mailed on Sep. 1, 2025, 7 pages (with English translation).

* cited by examiner

RATE CONTROL MACHINE LEARNING MODELS WITH FEEDBACK CONTROL FOR VIDEO ENCODING

CROSS-REFERENCE TO RELATED APPLICATION

This patent application is a continuation (and claims the benefit of priority under 35 USC 120) of U.S. patent application Ser. No. 18/030,182, filed Apr. 4, 2023, which is a National Stage Application under 35 U.S.C. § 371 and claims the benefit of International Application No. PCT/EP2021/080508, filed Nov. 3, 2021, which claims priority to U.S. Patent Application Ser. No. 63/109,270, filed on Nov. 3, 2020, the entire contents of all which are hereby incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a video compression system implemented as computer programs on one or more computers in one or more locations that performs video encoding using a rate control machine learning model.

Throughout this specification, an "amount of data" (e.g., that is required to represent an encoded representation of a video frame) can be measured in any appropriate unit of measurement, e.g., as a number of bits. A target amount of data for representing an encoded video may be specified, e.g., by a user of the video compression system.

According to a first aspect, there is provided a method performed by one or more data processing apparatus for encoding a video comprising a sequence of video frames to generate a respective encoded representation of each video frame, the method comprising, for one or more of the video frames: obtaining a feature embedding for the video frame; processing an input comprising the feature embedding for the video frame using a rate control machine learning model to generate a respective score for each of a plurality of possible quantization parameter values; selecting a quantization parameter value from the plurality of possible quantization parameter values using the scores; determining a cumulative amount of data required to represent: (i) an encoded representation of the video frame that is generated in accordance with a quantization step size associated with the selected quantization parameter value and (ii) encoded representations of each video frame that precedes the video frame; determining, based on the cumulative amount of data, that a feedback control criterion for the video frame is satisfied; updating the selected quantization parameter value in response to determining that the feedback control criterion is satisfied; and processing the video frame using an encoding model, in accordance with a quantization step size associated with the selected quantization parameter value, to generate the encoded representation of the video frame.

In some implementations, the input processed by the rate control machine learning model further comprises a target amount of data for representing the encoded video.

In some implementations, the feedback control criterion for the video frame specifies a target range of values, and wherein determining that the feedback control criterion for the video frame is satisfied, comprises: determining that the cumulative amount of data required to represent: (i) the encoded representation of the video frame that is generated in accordance with the quantization step size associated with the selected quantization parameter value and (ii) encoded representations of each video frame that precedes the video frame, is outside the target range of values specified by the feedback control criterion.

In some implementations, updating the selected quantization parameter value in response to determining that the feedback control criterion is satisfied comprises: determining an update to the selected quantization parameter value based on a difference between: (i) the cumulative amount of data, and (ii) a closest endpoint of the target range of values specified by the feedback control criterion for the video frame.

In some implementations, updating the selected quantization parameter value in response to determining that the feedback control criterion is satisfied comprises: determining that the cumulative amount of data is greater than an upper endpoint of the target range of values specified by the feedback control criterion; and adjusting the selected quantization parameter value to increase the quantization step size used to generate the encoded representation of the video frame.

In some implementations, updating the selected quantization parameter value in response to determining that the feedback control criterion is satisfied comprises: determining that the cumulative amount of data is less than a lower endpoint of the target range of values specified by the feedback control criterion; and decreasing the selected quantization parameter value to decrease the quantization step size used to generate the encoded representation of the video frame.

In some implementations, updating the selected quantization parameter value in response to determining that the feedback control criterion is satisfied comprises: identifying a set of candidate quantization parameter values, wherein the set of candidate quantization parameter values is a proper subset of the plurality of possible quantization parameter values having the highest scores; and selecting the updated quantization parameter value from the set of candidate quantization parameter values.

In some implementations, selecting the quantization parameter value from the plurality of quantization parameter values using the scores comprises: identifying a proper subset of the plurality of possible quantization parameter values having the highest scores; determining a probability distribution over the proper subset of the plurality of possible quantization parameter values; and sampling the quantization parameter value in accordance with the probability distribution over the proper subset of the plurality of possible quantization parameter values.

In some implementations, identifying the proper subset of the plurality of possible quantization parameter values having the highest scores comprises: identifying a predefined number of the plurality of possible quantization parameter values having the highest scores.

In some implementations, the rate control machine learning model has a neural network architecture that comprises one or more recurrent neural network layers.

In some implementations, the recurrent neural network layers comprise one or more long short-term memory (LSTM) recurrent neural network layers.

In some implementations, for each video frame, the input processed by the rate control machine learning model further comprises a quantization parameter value that was used for generating the encoded representation of a preceding video frame.

In some implementations, the method further comprises: obtaining a respective initial feature embedding for each video frame based on features of the video frame; processing the initial feature embeddings of the video frames using an embedding neural network that comprises one or more self-attention neural network layers to generate an updated feature embedding for each video frame; and determining the respective feature embedding for each video frame based at least in part on the updated feature embedding for the video frame generated by the embedding neural network.

In some implementations, the embedding neural network comprises a transformer neural network.

In some implementations, for each video frame, the initial feature embedding for each video frame is based at least in part on noise energy features for the video frame, motion vector statistics for the video frame, or both.

In some implementations, for each video frame, the feature embedding for the video frame is based at least in part on one or more of: a frame index of the video frame, a frame type of the video frame, an amount of data required to represent the encoded representation of a preceding video frame in the video, and data characterizing a difference between: (i) a cumulative amount of data required to represent the encoded representations of each video frame preceding the video frame in the video, and (ii) a target amount of data for representing the encoded video.

According to another aspect there is provided a method performed by one or more data processing apparatus for encoding a video comprising a sequence of video frames to generate a respective encoded representation of each video frame, the method comprising: for each video frame: obtaining a feature embedding for the video frame; processing an input comprising the feature embedding for the video frame using a rate control machine learning model to generate a respective score for each of a plurality of possible quantization parameter values; selecting a quantization parameter value from the plurality of possible quantization parameter values using the scores; and processing the video frame using an encoding model, in accordance with a quantization step size associated with the selected quantization parameter value, to generate the encoded representation of the video frame; wherein the rate control machine learning model has a plurality of model parameters that are trained on a set of training examples, wherein each training example comprises data defining: (i) a respective feature embedding for each training video frame of a training video, and (ii) a respective target quantization parameter value for each training video frame.

In some implementations, for each video frame, the input processed by the rate control machine learning model further comprises a target amount of data for representing the encoded video.

In some implementations, training the rate control machine learning model on the set of training examples comprises, for each training example: processing an input comprising the respective feature embedding for each training video frame using the rate control machine learning model to generate, for each training video frame, a respective score for each of the plurality of possible quantization parameter values; and determining an update to current values of the model parameters of the rate control machine learning model based on, for each training video frame, an error between: (i) the scores for the plurality of possible quantization parameter values generated for the training video frame, and (ii) the target quantization parameter value for the training video frame.

In some implementations, the error between: (i) the scores for the plurality of possible quantization parameter values generated for the training video frame, and (ii) the target quantization parameter value for the training video frame, comprises a cross-entropy error.

In some implementations, for each training video frame, the rate control machine learning model generates an output that further comprises an estimate of an amount of data required to represent an encoded representation of the training video frame.

In some implementations, the method further comprises: determining an update to the current values of the model parameters of the rate control machine learning model based on, for each training video frame, an error between: (i) the estimate of the amount of data required to represent the encoded representation of the video frame, and (ii) an actual amount of data required to represent the encoded representation of the video frame.

In some implementations, the method further comprises determining an update to the current values of the model parameters of the rate control machine learning model based on an error between: (i) a total of the estimates of the amount of data required to represent the encoded representations of the training video frames, and (ii) a total amount of data required to represent the encoded representations of the training video frames.

In some implementations, for one or more of the training examples, the target quantization parameter values for the training video frames of the training example are generated by performing an optimization to determine quantization parameter values for the training video frames that minimize a measure of error between: (i) the training video frames, and (ii) reconstructions of the training video frames that are determined by processing encoded representations of the training video frames that are generated using the quantization parameter values.

In some implementations, the optimization is a constrained optimization subject to a constraint that a total amount of data required to represent encoded representations of the training video frames that are generated using the quantization parameter values be less than a target amount of data for representing the encoded representations of the training video frames.

In some implementations, each training example further comprises data defining a target amount of data for representing the encoded representations of the training video frames in the training video.

In some implementations, training the rate control machine learning model comprises: training the rate control machine learning model on a first set of training examples; generating a second set of training examples using the rate control machine learning model, wherein for each training example in the second set of training examples: the respective target quantization parameter value for each training video frame is determined in accordance with current values of the model parameters of the rate control machine learning model; and the target amount of data for representing the encoded representations of the training video frames in the training video is an amount of data required to represent the encoded representations of the training video frames if each training video frame is encoded using the target quantization parameter value for the training video frame; and training the rate control machine learning model on the second set of training examples.

According to another aspect there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

The video compression system described in this specification uses a rate control machine learning model that can enable the video compression system to encode videos at higher compression rates while maintaining comparable video quality compared to video compression systems using conventional rate control algorithms. Therefore, the video compression system can enable more efficient use of resources, e.g., by reducing the amount of memory required to store encoded videos, and by reducing the amount of bandwidth required to transmit encoded videos over data communication networks, e.g., the internet.

The video compression system can use a feedback control mechanism to adjust quantization parameter values selected using the rate control machine learning model. The feedback control mechanism can adjust the quantization parameter values to increase the likelihood that encoded videos generated by the video compression system are represented by an amount of data (e.g., number of bits) that does not significantly deviate from a target amount of data for representing the encoded videos. That is, the feedback control mechanism can increase the likelihood that the video compression system optimally (fully) utilizes the target amount of data for representing an encoded video. Using less than the target amount of data to represent the encoded video can result in unnecessary loss of information and can therefore prevent accurate decompression of the encoded video. Using more than the target amount of data to represent the encoded video can result in the encoded video violating memory usage constraints and thus being unusable. The feedback control mechanism thus enables more efficient use of computational resources, e.g., memory resources.

The rate control machine learning model of the video compression system can learn an effective rate control policy by imitation learning, e.g., by learning to generate quantization parameter values that match target quantization parameter values specified by training examples in a set of training data. Using imitation learning techniques can enable the rate control machine learning model to be trained over a shorter duration of time and using fewer computational resources (e.g., memory and computing power) than would be possible using other learning techniques, e.g., reinforcement learning techniques. In particular, the rate control machine learning model can be trained to imitate optimal or near-optimal rate control policies (e.g., that are determined through numerical optimization), which can be significantly faster than attempting to learn an effective rate control policy from scratch by reinforcement learning. (The rate control machine learning model can also be trained by techniques other than imitation learning, e.g., reinforcement learning).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
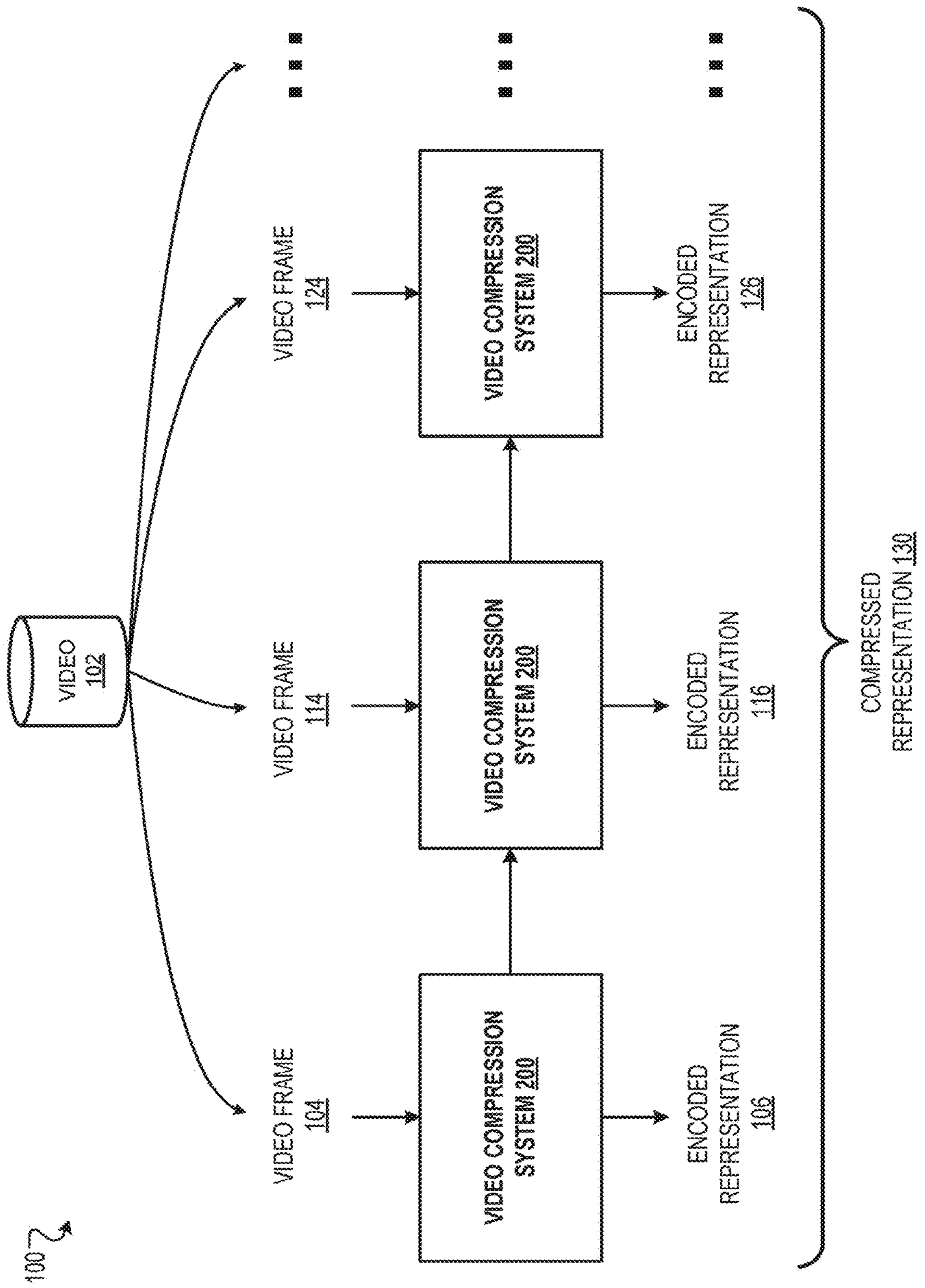
FIG. 1 is a block diagram illustrating an example of encoding a video including a sequence of video frames.

FIG. 1 shows an example block diagram 100 illustrating the operations perform by a video compression system for encoding a video that includes a sequence of video frames. In an example, the video frames may comprise images of the real world captured using a video camera. An example video compression system, e.g., the video compression system 200, that can perform the operations illustrated in the block diagram 100 is described in more detail below with reference to FIG. 2.

The video compression system 200 processes a video 102 that includes a sequence of video frames to generate a respective encoded representation of each video frame (e.g., represented by an ordered collection of numerical values, such as a vector or matrix of values) such that the video compression system 200 performs compression of the video 102 to generate a compressed representation 130 of the video.

The video can be a black and white video, where each video frame is represented by a respective grayscale pixel value for each pixel in the video frame (e.g., represented by a numerical value). In another example, the video can be a color video, where each video frame is represented by a respective red-green-blue (RGB) pixel value for each pixel in the video frame (e.g., represented by a vector of numerical values).

The video compression system 200 is configured to process the sequence of video frames (e.g., video frames 104, 114, 124) of the video 102 and, for each video frame in the sequence of video frames, data characterizing any preceding video frames before the video frame and already compressed by the video compression system 200 (e.g., an amount of data required to represent the encoded representations of the preceding video frames, etc.) to generate an encoded representation of each video frame (e.g., encoded representations 106, 116, and 126, respectively). Each of the encoded representations 106, 116, 126 is a smaller amount of data (e.g. a smaller number of bytes) than the corresponding video frame 104, 114, 124. Furthermore, the video compression system 200 can generate the compressed representation 130 by further processing a target amount of data ("data budget"). The video compression system 200 can generate the compressed representation 130 using the target amount of data as the goal amount of data to represent the compressed representation 130, as described below with reference to FIG. 2. The target amount of data for representing the compressed representation 130 of the video can be measured, e.g., in bits, and can be specified, e.g., by a user of the video compression system 200.

The encoded representations of the video frames can represent compressed versions of the video frames such that each encoded representation can be represented using a smaller amount of data (e.g., fewer bits) than would be required to represent the corresponding video frame. That is, the video compression system 200 processes the video 102 to generate the compressed representation 130 such that the compressed representation 130 requires a smaller amount of data to represent than an amount of data required to represent the video 102.

An encoded representation of a video frame can be represented by an ordered collection of numerical values, e.g., a sequence of bits, and the encoded representations of the video frames can collectively define the compressed representation 130 of the video.

The compressed representation 130 (i.e., including the encoded representations of the video frames) can be transmitted (e.g., over a data communications network, such as the internet, a local area network (LAN), a wide area network (WAN), etc.) and/or stored in a data store (e.g., a physical data storage device or a logical data storage area). The transmission can be to a user device (e.g., a computer or mobile device), a computer server (e.g., a video platform server), or a data store.

The compressed representation 130 of the video can be processed to generate a reconstruction (e.g., an approximate reconstruction or an exact reconstruction) of the video represented by the sequence of video frames processed to generate the encoded representations. In particular, a video decompression system can process the respective encoded representation of each video frame to generate a reconstruction of the video frame, and the reconstructions of the video frames can collectively define a reconstruction of the video.

Figure 2:
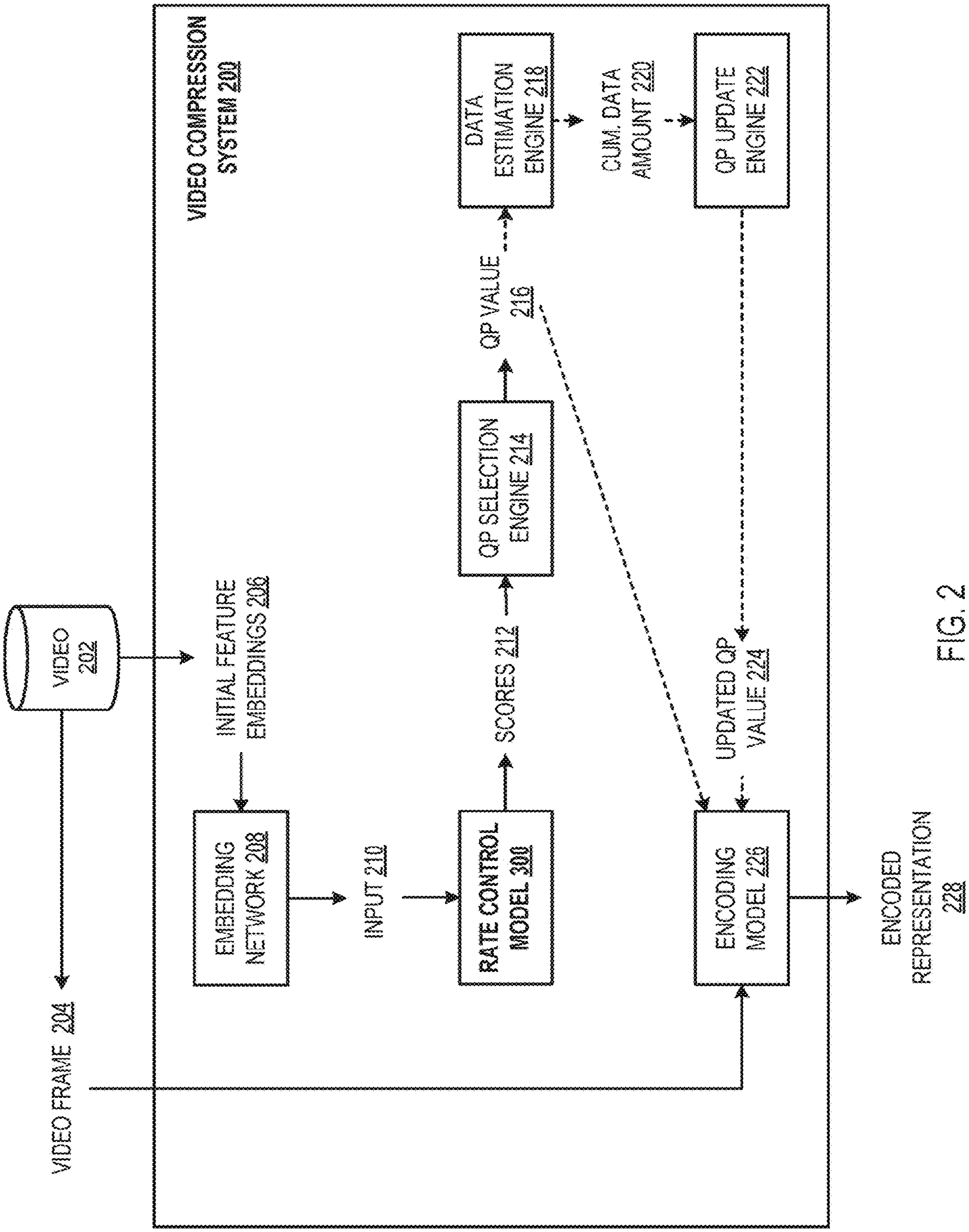
FIG. 2 is a block diagram of an example video compression system.

FIG. 2 shows an example video compression system 200. The video compression system 200 is an example of a system implemented as computer programs on one or more computers in one or more locations in which the systems, components, and techniques described below are implemented.

The video compression system 200 processes a video frame 204 from a video 202 that includes a sequence of video frames to generate an encoded representation 228 of the video frame 204. The video frame 204 can include one or more pixels (e.g., where each pixel is represented by a numerical value for grayscale pixels, or an ordered collection of numerical values for red-green-blue (RGB) pixels). The encoded representation 228 can be represented by, e.g., an ordered collection of numerical values, such as a sequence of bits.

The video compression system 200 includes an embedding network 208, a rate control model 300, a quantization parameter (QP) selection engine 214, a data estimation engine 218, a QP update engine 222, and an encoding model 226, which are each described in more detail below.

The video compression system 200 can use the embedding neural network 208 to generate a respective feature embedding of each video frame in the video, i.e., a representation of features of the video frame as an ordered collection of numerical values, e.g., a vector or matrix of numerical values.

For example, the video compression system 200 can generate an "initial" feature embedding of each video frame based on features of the video frame, e.g., statistical features, e.g., noise energy features of the video frame and/or motion vector statistics for the video frame. This can be done using a unit (not shown) of a conventional design. The unit may not include an adaptive parameter. In one example, the unit may partition the video frame into sections, and obtain the initial feature embedding as a dataset comprising at least one respective statistical value for each section. The video compression system 200 can then jointly process the initial feature embeddings of the video frames using the embedding neural network 208 to generate a respective updated feature embedding of each video frame. The video compression system 200 can then determine a respective feature embedding for each video frame based on the updated feature embedding generated by the embedding neural network for the video frame, as described below. Note that in a variant the embedding network 208 may receive the raw video frames of the video 202 (e.g. sequentially) and generate from them respective feature embeddings which play the role of the "updated feature embeddings" described below.

The embedding network 208 can have any appropriate neural network architecture that enables it to perform its described functions, e.g., processing the respective initial feature embeddings for the video frames to generate updated feature embeddings for the video frames. In particular, the embedding neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers). In a particular example, the embedding neural network can include one or more self-attention neural network layers. For example, the embedding neural network can include a transformer neural network, e.g., the encoder portion of the transformer neural network described with reference to: Ashish Vaswani et al., "Attention is all you need," Advances in Neural Information Processing Systems 30 (NIPS), 2017, arXiv:1706.03762v5.

For each video frame, the video compression system 200 can determine the respective feature embedding for the video frame based at least in part on the updated feature embedding for the video frame (i.e., that is generated by the embedding neural network 208). In addition to the updated feature embedding for the video frame, the respective feature embedding for the video frame can include, e.g., a concatenation of a frame index of the video frame (e.g., indicating the position of the video frame in the sequence of video frames of the video), a frame type of the video frame (e.g., represented by a one-hot vector over the possible frame types, e.g., key frame, alternate reference frame, inter frame), an amount of data required to represent the encoded representation of a preceding video frame (e.g., represented by a number of bits), and/or data characterizing a difference between: (i) a cumulative amount of data required to represent the encoded representations of each video frame preceding the video frame in the video, and (ii) a target amount of data ("data budget") for representing the encoded video (e.g., the target amount of data for representing the compressed representation 130 of FIG. 1).

As part of generating an encoded representation 228 of a video frame 204, the rate control machine learning model 300 processes an input 210 that includes at least the feature embedding for the video frame to generate a respective score 212 for each of a plurality of possible quantization parameter values. The input 210 can further include the target amount of data for representing the encoded video (e.g., represented by a number of bits) and/or a quantization parameter value that was used for generating the encoded representation of a preceding video frame (e.g., as a concatenation of the respective feature embedding for the video frame, the target amount of data, and the preceding quantization parameter value). The respective score for each possible quantization parameter value can be represented, e.g., by a numerical value.

The possible quantization parameter values can be represented by, e.g., a collection of integer values, such as integer values in the range [0, 255]. Each quantization parameter value can be associated with a respective quantization step size (e.g., by mapping quantization parameter values onto corresponding quantization step sizes in accordance with a predefined monotonic mapping). The quantization step size is used by the encoding model 226 to generate the encoded representation 228. Here a "quantization step size" is a numerical parameter which varies inversely with a required precision in encoding the video frame 204 to form the encoded representation 228. That is, it is indicative of a level of error which is tolerated between the video frame 204 and a reconstructed video frame which can be obtained from the encoded representation 228. A larger quantization step size leads to a smaller data amount to encode the video frame and a smaller quantization step size leads to smaller quantization error, as described in further detail below.

The rate control model 300 can have any appropriate machine learning model architecture (e.g., a neural network architecture, a random forest architecture, or a support vector machine architecture) that enables it to perform its described function, i.e., processing an input that includes at least the feature embedding for a video frame to generate quantization parameter scores. In a particular example, if the rate control model 300 is a neural network model, then the rate control model can include any appropriate types of neural network layers (e.g., fully-connected layers, attention-layers, convolutional layers, etc.) in any appropriate numbers (e.g., 1 layer, 5 layers, or 25 layers), and connected in any appropriate configuration. In a particular example, the rate control model can include one or more recurrent neural network layers (e.g., long short-term memory (LSTM) neural network layers) and one or more multi-layer perceptron (MLP) neural network layers, as is described in further detail below with respect to FIG. 3.

The quantization parameter (QP) selection engine 214 processes the scores 212 to select a quantization value (QP) value 216 for the video frame 204. The QP selection engine 214 can select the QP value 216 in accordance with the scores 212. A few example techniques by which the QP selection engine 214 can select the QP value 216 for the video frame 204 are described next.

In one example, the QP selection engine 214 can select the QP value 216 corresponding to the largest score in the scores 212.

In another example, the scores 212 can define a probability distribution over the set of possible QP values, and the QP selection engine 214 can sample the QP value 216 from the possible quantization parameter values in accordance with probability distribution.

In another example, the QP selection engine 214 can sample the QP value 216 from a subset of the possible quantization parameter values in accordance with the corresponding scores in the scores 212. In a particular example, the QP selection engine 214 samples the QP value 216 from the N (e.g., 5, 15, or 25) quantization parameter values corresponding to the highest scores in the scores 212, where N is a positive integer (e.g. a predefined integer). The QP selection engine 214 can apply a softmax function over the scores for the N quantization parameter values (i.e., having the highest scores) to generate a probability distribution over the N quantization parameter values, and sample the QP value 216 from the N quantization parameter values in accordance with the probability distribution over the N quantization parameter values.

If the video compression system 200 samples the QP value 216 from the full set of possible QP values, the video compression system 200 may occasionally sample a poorly chosen QP value. Selecting a poorly chosen QP value can cause the amount of data used to generate the encoded representation 228 to be too large or too small, and can lead to the amount of data required to represent the compressed representation of the video 202 to substantially deviate from the target amount of data for representing the compressed representation. Sampling the QP value 216 from a subset of the possible quantization parameter values associated with the largest scores in the scores 212 can help prevent the video compression system from sampling a poor QP value, and therefore deviate less from the target amount of data for the compressed representation.

The data estimation engine 218 processes the QP value 216 to determine a cumulative amount of data (e.g., cum. data amount 220) required to represent (i) an encoded representation of the video frame that is generated in accordance with the QP value 216, and (ii) encoded representations of each video frame that precedes the video frame. The cumulative data amount 220 can be represented by, e.g., a number of bits. For example, the data estimation engine 218 can determine the cumulative amount of data 220 as the sum of: (i) an amount of data that would be required to represent the current video frame 204 if the current video frame were encoded using the QP value 216, and (ii) a total amount of data required to represent the encoded representations of the preceding video frames.

The video compression system 200 uses the cumulative amount of data 220 to determine whether a feedback control criterion is satisfied. If the video compression system 200 determines that the feedback control criterion is not satisfied, then the video compression system uses the encoding model 226 to generate the encoded representation 228 of the video frame 204 using the QP value 216 selected using the rate control model 300. If the video compression system 200 determines that the feedback control criterion is satisfied, then the video compression system 200 uses the quantization parameter (QP) update engine 222 to determine an updated QP value 224, and generates the encoded representation of the video frame 204 using the updated QP value 224.

The video compression system 200 can determine that the feedback control criterion is satisfied if the cumulative amount of data 220 is outside a target range of values specified by the feedback control criterion for video frame. The target range of values can represent how much of the data budget (i.e., target amount of data) the video compression system 200 should have used to encode the video frames in the video up to and including the video frame 204. Generally the feedback control criterion specifies a different target range of values for each video frame, i.e., depending on the frame index of the video frame. An example illustrating a respective target range of values for each video frame in a video is shown with reference to FIG. 4.

The target range of values specified by the feedback control criterion for the video frame can include an upper endpoint and a lower endpoint. If the cumulative amount of data is above the upper endpoint, then the QP update engine 222 can increase the QP value 216 for the video frame, i.e., to reduce the number of bits for encoding the current video frame. If the cumulative amount of data is below the lower endpoint, then the QP update engine 222 can decrease the QP value 216 for the video frame, i.e., to increase the number of bits for encoding the current video frame. For example, the QP update engine 222 can determine the update to the quantization parameter value 216 based on a difference between (i) the cumulative amount of data 220 and (ii) a closest endpoint of the target range of values specified by the feedback control criterion for the video frame, as is described in further detail with respective to FIG. 5.

The encoding model 226 is configured to process the video frame 204 in accordance with the selected QP value (i.e., the QP value 216 selected by the rate control model 300, or if the feedback control criterion is satisfied, then the updated QP value 224) to generate the encoded representation 228 of the video frame 204. The encoded representation 228 is a compressed representation of the video frame 204 (i.e., that occupies less space in a memory). The encoding model 226 can be any appropriate encoding model, e.g., a libvpx implementation of VP9, Xvid, FFmpeg MPEG-4, or DivX Pro Codec. Corresponding algorithms are known for decompressing the encoded representation 228 (e.g. after the encoded representations for all the video frames 204 of the video 202 have been transmitted over a communication channel to a receiver) to reconstruct the video frame 204 with an error which depends upon the selected QP value, so that a video comprising the reconstructed video frames can be displayed on a screen.

Generally, as part of generating an encoded representation 228 of a video frame, the encoding model 226 performs quantization, i.e., by quantizing the video frame 204 or data derived from the video frame 204 in accordance with the quantization step size specified by the selected QP value. Quantizing a value can refer to mapping the value onto the closest one of a set of quantized values. The encoding model 226 may perform the quantization, e.g., as part of implementing an entropy encoding algorithm. A lower quantization step size can result in a finer quantization that minimizes information loss, while a higher quantization step size can result in a coarser quantization that increases information loss. For example, if the set of quantized values are considered as an ordered sequence of increasing values, the quantization step size may be a pairwise separation of the quantized values of the set of quantized values. In other examples, the pairwise separation of the quantized values is not constant (e.g. it may be smaller between lower quantized values of the set than between higher quantized values of the set) according to an equation having the quantization step size as a parameter. Determining a quantization step size corresponds, in either case, to selecting a respective set of quantized values. The highest and lowest quantized values of each set may respectively be the same (e.g. all the sets may have a lowest quantized value of 0 and a highest quantized value of 255).

Figure 3:
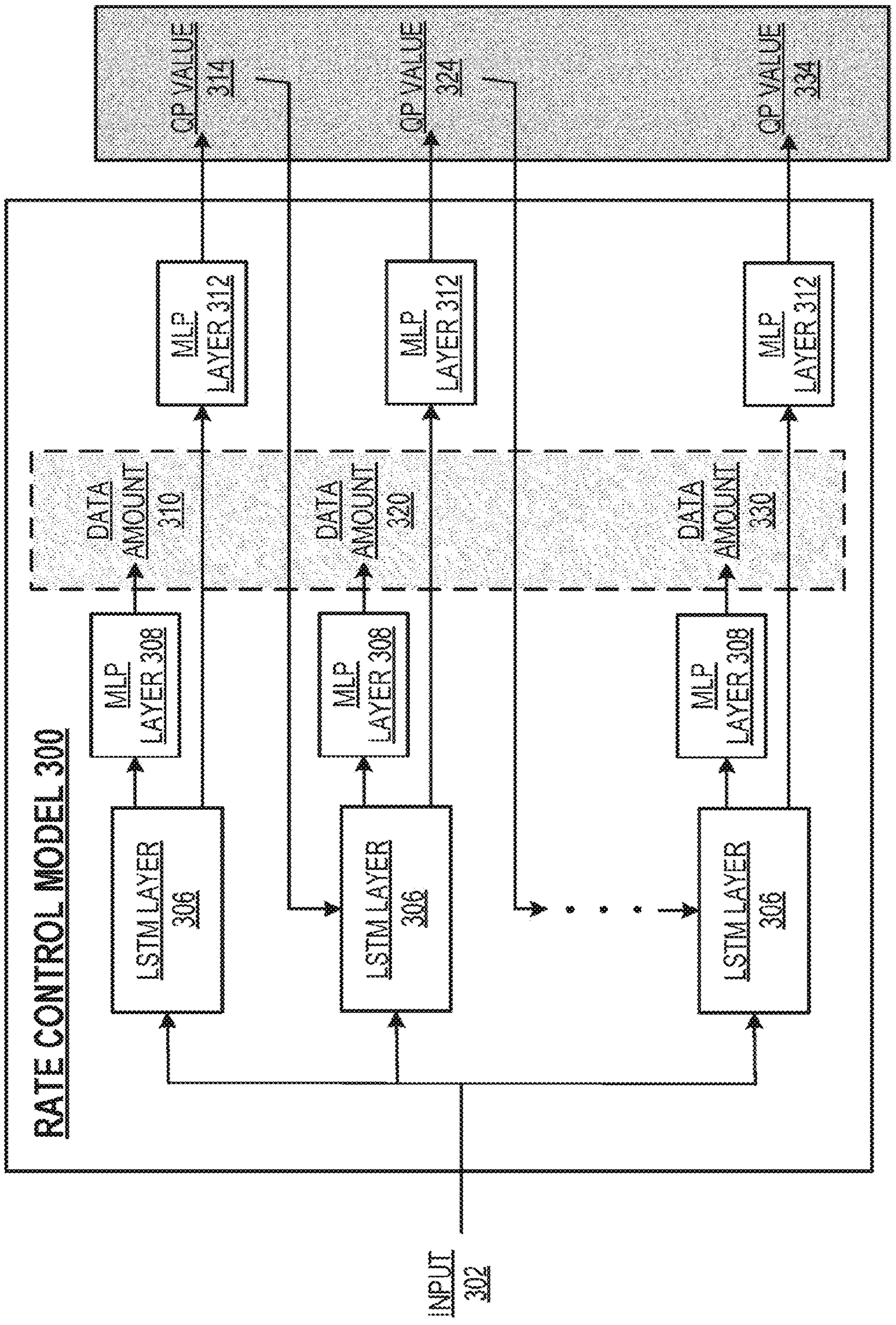
FIG. 3 is a block diagram of an example rate control model.

FIG. 3 shows an example rate control machine learning model 300 having a neural network architecture. The rate control model 300 is an example of a system implemented as computer programs on one or more computers in one or more locations in which the systems, components, and techniques described below are implemented.

The rate control model 300 processes at each of a number of time steps a respective input 302 that includes a respective feature embedding for each respective video frame in a video to generate a respective quantization parameter (QP) value for each video frame. The QP value for each video frame can be associated with a quantization step size used to generate an encoded representation of the video frame by an encoding model (e.g., encoding model 226 of FIG. 2). Optionally, during training, the rate control model 300 can further generate a predicted amount of data ("data amount") for each video frame. The data amount for each video frame can represent, e.g., a predicted amount of data that is required to generate an encoded representation of the video frame in accordance with a quantization step size associated with the QP value for the video frame.

The rate control model 300 includes a long short-term memory (LSTM) neural network layer 306, a multi-layer perceptron (MLP) neural network layer 308, and a (second) multi-layer perceptron (MLP) neural network layer 312. Optionally, as illustrated in FIG. 3, a separate branch may be provided for each of a set of possible QP values 314, 324, 334 to generate a score for that respective QP value, with the branch including a respective LSTM layer 306, a respective (first) MLP neural network layer (which may optionally be omitted if no data amount is to be calculated for that QP value) and a respective (second) MLP neural network layer 312 to generate the respective score. However, in a variant, there could be just a single LSTM layer, a single (optional) MLP neural network, and a single (second) MLP neural network layer, where the MLP neural network(s) are configured to generate a respective output for each of the respective possible QP values.

The rate control model 300 sequentially processes a respective input 302 corresponding to each video frame in the video to generate a respective QP value for each video frame in the video. For each video frame, the input includes the feature embedding for the video frame, and for each video frame after the first video frame, the input further includes the QP value selected for the preceding video frame. The QP value selected for the preceding video frame may be the QP value generated by the rate control model 300 for the preceding video frame, or if a feedback control criterion was satisfied for the preceding video frame, an updated QP value selected by the video compression system, as described above.

In particular, for each video frame, the LSTM layer 306 processes the input 302 for the video frame to generate an LSTM layer output, and the MLP layer 312 processes the LSTM layer output to generate a score distribution over a set of possible QP values for the video frame. Optionally, during training, the MLP layer 308 can process the LSTM output to generate a predicted data amount (e.g., 310, 320, 330) for the video frame, i.e., that estimates an amount of data (e.g., measured in bits) that would be required to represent the video frame using the QP value selected by the rate control model for the video frame. (The MLP layer 308 generates the predicted data amount without having access to the QP value that is ultimately selected for the video frame). Training the rate control model to accurately estimate the amount of data (310, 320, 330) that would be required to represent each video frame provides an auxiliary training signal that can enable the LSTM layer 306 to generate more informative internal representations of video frames, and therefore, to select QP values more effectively. Training the rate control model 300 will be described in more detail below with reference to FIG. 6.

Figure 4:
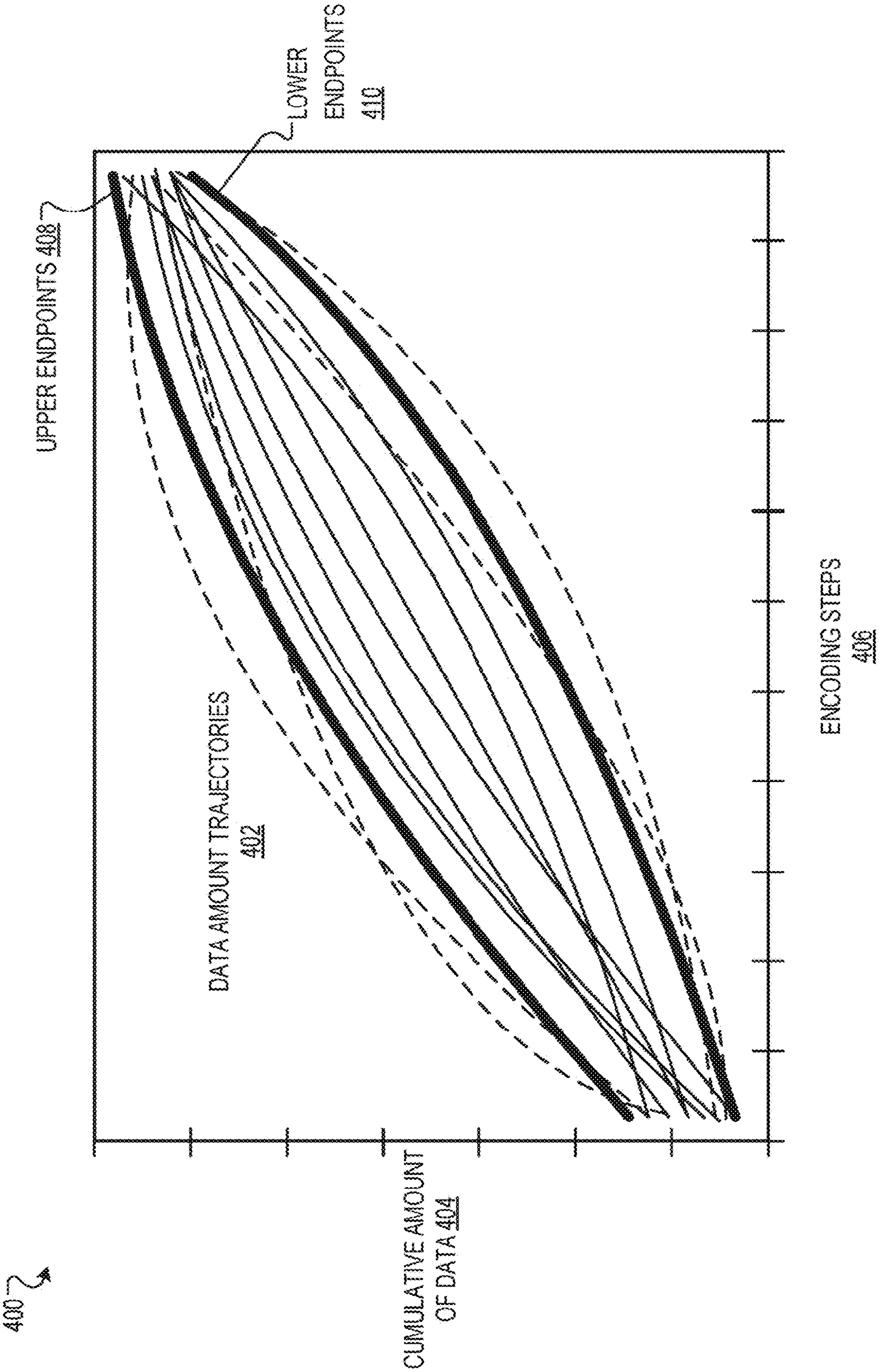
FIG. 4 is a diagram illustrating data amount trajectories with respect to a target range of values for each video frame.

FIG. 4 is a diagram illustrating data amount trajectories generated for encoding videos with respect to a target range of values for each video frame in the video. For example, the data amount trajectories can be generated by a rate control model, e.g., the rate control model 300 of FIG. 2.

The data amount trajectories 402 are illustrated on a graph with a cumulative amount of data 404 as the 'y axis' and encoding steps 406 as the 'x axis'. Each data amount trajectory in the data amount trajectories 402 represents a sequence of cumulative data amounts required to represent the video frames up to a current video frame in a video. Each video frame is encoded at a respective encoding step of the encoding steps 406. With respect to FIG. 4, the data amount trajectories are shown using dashed and solid lines, as described below.

The graph includes the target range of values for each video frame. The target range of values includes a sequence of upper endpoints 408 across the encoding steps 406, and a sequence of lower endpoints 410 across the encoding steps 406. With respective to FIG. 4, the upper endpoints 408 and the lower endpoints 410 are each shown using a bolded, solid line.

Each data amount trajectory that includes at least one cumulative data amount that exceeds the upper endpoint of the target range at the corresponding encoding step is shown using a dashed line. Each data amount trajectory that includes at least one cumulative data amount that is smaller than the lower endpoint of the target range at the corresponding encoding step is also shown using a dashed line. Each data amount trajectory for which the cumulative data amounts are between the upper endpoints 408 and lower endpoints 410 at every corresponding encoding step, is shown as a solid line.

At each encoding step where a data amount trajectory is outside the target range of values, the quantization parameter value used to generate the video frame at the encoding step can be adjusted. For example, (taking the case that increasing QP values correspond to decreasing quantization step sizes) if the cumulative amount of data for the encoding step is above the upper endpoint, then the quantization parameter value can be adjusted down, i.e., to reduce the number of bits for encoding the current video frame. If the cumulative amount of data for the encoding step is below the lower endpoint, then the quantization parameter value for the video frame can be adjusted up, i.e., to increase the number of bits for encoding the current video frame, as is described in further detail with respective to FIG. 5.

Figure 5:
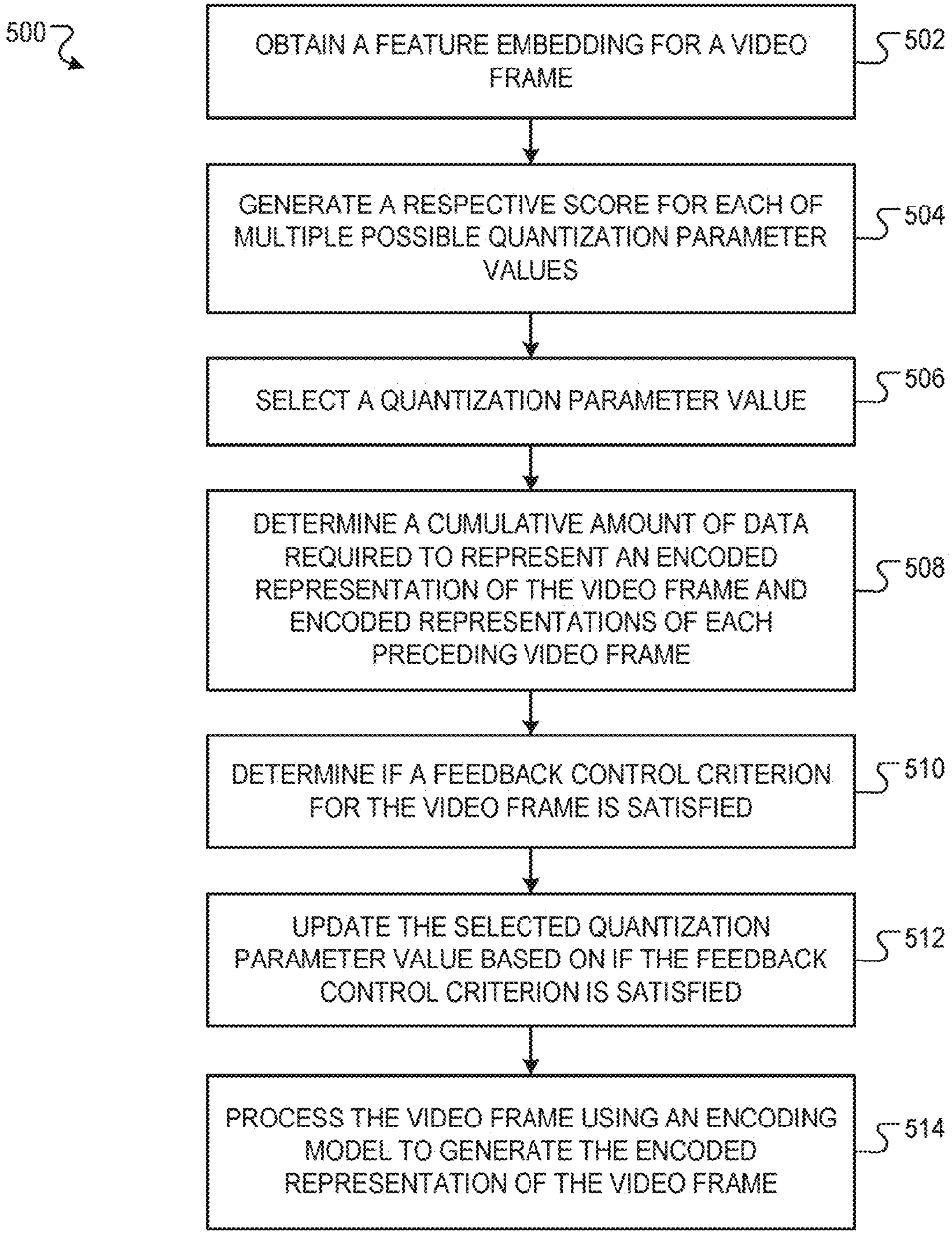
FIG. 5 is a flow diagram of an example process for encoding a video frame.

FIG. 5 is a flow diagram of an example process for encoding a video frame. For convenience, the process 500 will be described as being performed by a system of one or more computers located in one or more locations. For example, a video compression system, e.g., the video compression system 200 of FIG. 2, appropriately programmed in accordance with this specification, can perform the process 500.

The system obtains a feature embedding for a video frame (502). The system can generate a respective feature embedding for each video frame in the video, e.g., by generating a respective initial feature embedding for each video frame based on statistics of the video frame (e.g., noise energy statistics and/or motion vector statistics). The system can then jointly process the initial feature embeddings for the video frames using an embedding neural network to generate a respective updated feature embedding for each video frame. The system can optionally include additional data in the updated feature embedding for a video frame to generate the final feature embedding for the video frame, e.g., data defining a frame index and/or a frame type of the video frame.

The system generates a respective score for each of multiple possible quantization parameter values (504). The system can generate the respective scores using a rate control machine learning model (e.g., the rate control model 300 of FIG. 2). For example, the rate control model can process the feature embedding for the video frame to generate a respective score for each quantization parameter value in a set of possible quantization parameter values.

The system selects a quantization parameter value for the video frame (506). The system can select the quantization parameter value from the possible quantization parameter values based on the respective scores for the possible quantization parameter values. For example, the system can select the quantization parameter value corresponding to the largest score, or the system can select the quantization parameter value by sampling from the possible quantization parameter values in accordance with the respective scores. In one example, the system can sample the quantization parameter value from a subset of the possible quantization parameter values in accordance with the respective scores. The subset can include possible quantization parameter values, e.g., corresponding to the highest scores (e.g., 5, 15, or 25 possible quantization parameter values).

The system determines a cumulative amount of data required to represent: (i) an encoded representation of the video frame that is generated in accordance with the QP value, and (ii) encoded representations of each preceding video frame (508). The system can determine the cumulative amount of data by determining the respective amount of data required to represent each video frame (e.g., the video frame and each preceding video frame) and summing the respective amounts of data. For example, the system can determine the respective amount of data required to generate the encoded representation of each video frame in accordance with the respective quantization parameter value for the video frame.

The system determines if a feedback control criterion for the video frame is satisfied (510). The feedback control criterion can include a condition that the cumulative amount of data is outside a target range of values specified by the feedback control criterion. The target range of values specified by the feedback control criterion can include an upper endpoint and (optionally) a lower endpoint. The target range of values can be determined, e.g., by fitting two parameterized logarithmic functions as the boundaries of the target values on a collection of training data amount trajectories used to train the rate control model such that i) most (e.g., at least a predefined fraction) of the data amount trajectories fall within the boundaries and ii) the boundaries are wide in the middle of the encoding steps, as $$a_1 \log(a_2 x + a_3) + a_4 x + a_5, \tag{1}$$

where $a_1$, $a_2$, $a_3$, $a_4$, $a_5$ represent the parameters to be determined by the fitting procedure, and x represents the cumulative amount of data at each encoding step in the data amount trajectories. Other functions can also be used.

For example, the system can determine that the feedback control criterion is satisfied if the cumulative amount of data is outside the target range of values, e.g., above the upper endpoint of the target range of values, or below the lower endpoint of the target range of values.

The system updates the selected quantization parameter value based on whether the feedback control criterion is satisfied (512). If the feedback control criterion is not satisfied, then the system does not update the quantization parameter value selected by the rate control model. If the feedback control criterion is satisfied, the system can determine the update to the quantization parameter value based on a difference between (i) the cumulative amount of data and (ii) a closest endpoint of the target range of values specified by the feedback control criterion for the video frame.

In one example, if the feedback control criterion is satisfied such that the cumulative data amount is greater than the upper endpoint of the target range of values, the system can adjust the selected quantization parameter value to increase the quantization step size (e.g., to decrease the amount of data) used to generate the encoded representation of the video frame.

In another example, if the feedback control criterion is satisfied such that the cumulative data amount is less than the lower endpoint of the target range of values, the system can adjust the selected quantization parameter value to decrease the quantization step size (e.g., to increase the amount of data) used to generate the encoded representation of the video frame.

In response to determining that the feedback control criterion is satisfied, the system can identify a set of M candidate quantization parameter values, where the set of candidate quantization parameter values is a proper subset of the multiple possible quantization parameter values that correspond to the highest scores. The multiple possible quantization parameter values that correspond to the highest scores can include the N highest scores, e.g., 20, 40, or 60. The numbers N and M (where M is less than N) can be, e.g., predefined. The system can determine the update to the quantization parameter value for the video frame by selecting the updated quantization parameter value from the set of candidate quantization parameter values. For example, the system can determine an ordered list of the top-N quantization parameter values from smallest to largest, and index them from $QP_1$ to $QP_N$. Then the system can determine the update as, $$j = \begin{cases} \min(1, i - \alpha(B_t^{lower} - B_t)), & \text{if } B_t < B_t^{lower} \\ i, & \text{if } B_t^{lower} \le B_t \le B_t^{upper} \\ \max(N, i + \alpha(B_t - B_t^{upper})), & \text{if } B_t > B_t^{upper}, \end{cases} \quad (2)$$

where i indexes the original quantization parameter value $QP_i$ sampled from the M (e.g., 15) quantization parameter values corresponding to the highest scores, j indexes the updated quantization parameter value $QP_j$, t indexes the video frames, $B_t$ represents the cumulative data amount for the video frame t, $$B_t^{lower}$$

represents the lower end point of the target range of values for the video frame t, $$B_t^{upper}$$

represents the upper end point of the target range of values for the video frame t, and $\alpha$ represents a constant (e.g., a positive real number) adjusting the strength of the feedback control.

In other words, the algorithm samples one of the M quantization parameter values with the highest respective scores; determines from it a corresponding integer value i which is one of the values from 1 to M, and which indicates where the sampled quantization parameter value lies in the ordered list of those M quantization parameter values; obtains a corresponding value of j from Eqn. (2); and updates the selected quantization parameter value to be the one of the top N quantization parameter values having the highest respective scores, which is in position j in the ordered list of those N quantization parameter values.

Note that this is not the only way in which the selected quantization parameter value obtained in (506) could be updated in (512). An alternative, for example, would be, when the feedback control criterion was satisfied because the cumulative data amount is greater than (less than) the higher (lower) endpoint of the target range of values, to repeatedly modify the selected quantization parameter value to increase (decrease) the quantization step size until the cumulative data amount is within the target range of values.

Using a feedback control mechanism to adjust quantization parameter values can increase the likelihood that encoded videos generated by the video compression system are represented by an amount of data (e.g., number of bits) that does not significantly deviate from a target amount of data for representing the encoded videos.

The system can process the video frame using an encoding model to generate an encoded representation of the video frame (514). The encoding model can generate the encoded representation of the video frame in accordance with a quantization step size associated with the selected (i.e. updated in the case that the determination in step 510 was positive) quantization parameter value. The encoding model can be any appropriate encoding model, e.g., libvpx (i.e., an open source implementation of VP9), Xvid, FFmpeg MPEG-4, or DivX Pro Codec.

Figure 6:
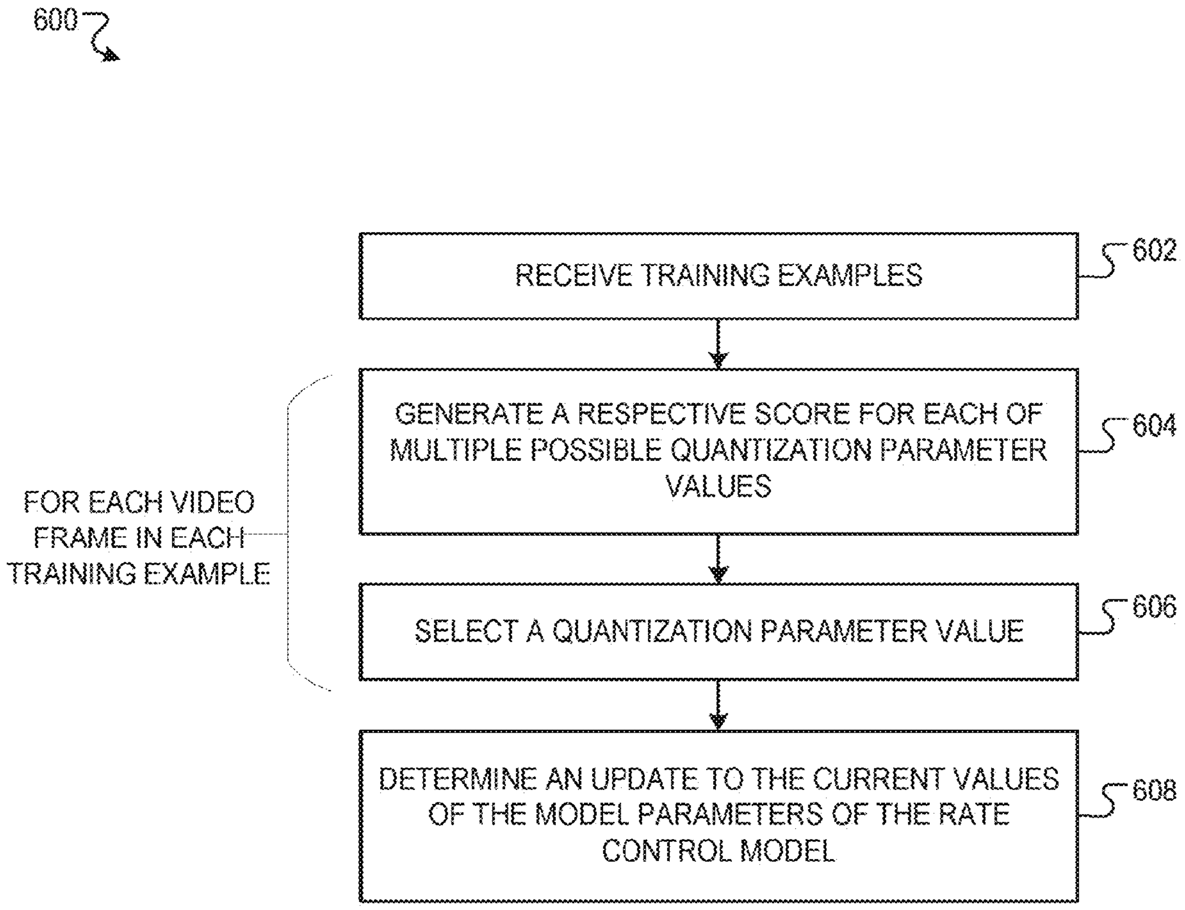
FIG. 6 is a flow diagram of an example process for training a rate control model.

FIG. 6 is a flow diagram of an example process for training a rate control model. For convenience, the process 600 will be described as being performed by a system of one or more computers located in one or more locations.

The system can train the rate control machine learning model on a first set of training examples using imitation learning, as described below. More generally, the system can train the rate control machine learning model using any appropriate technique, e.g. imitation learning, or reinforcement learning.

In one example, after training the rate control model on the first set of training examples, the system can generate a second set of training examples using the rate control model, and then train the rate control model on the second set of training examples. The system can generate the second set of training examples from the first set of training examples using the rate control model, as described in further detail in FIG. 6.

The system can perform the steps (602)-(610) at each of one or more training iterations to train the rate control model. For convenience, the system is described below for a single training iteration.

The system receives training examples (602). Each training example can include data defining (i) a respective feature embedding for each training video frame of a training video, and (ii) a respective target quantization parameter value for each training video frame. For example, the system can sample a batch of training examples from a set of training examples.

For each video frame in each training example, the system generates a respective score for each of multiple possible quantization parameter values (604). The system can process at least the feature embedding for the video frame using a rate control model to generate the respective scores for multiple possible quantization parameter values. For example, the system can generate the respective scores for multiple possible quantization parameter values from the integers [0, 255] using a rate control model as described in FIG. 2 and FIG. 3.

Optionally, for each video frame in each training example, the system selects a quantization parameter value for the video frame (606). The system can select the quantization parameter for the video frame based on the respective scores for the multiple possible quantization parameter values. For example, the system can select the quantization parameter value corresponding to the largest score. In another example, the system can sample the quantization parameter value from the multiple possible quantization parameter values in accordance with the respective scores. In another example, the system can sample the quantization parameter value from a subset of the possible quantization parameter values. The subset can include N possible quantization parameter values that correspond to the N largest scores. The system can generate a probability distribution over the N possible quantization parameter values in the subset (e.g., using a softmax function over the N corresponding scores), and sample the quantization parameter value in accordance with the probability distribution.

The system determines an update to the current values of the model parameters of the rate control model (608) using supervised learning techniques. For each training example, the system can determine the update based on, for each training video frame in the training video, an error between (i) the scores for the possible quantization parameter values generated for the training video frame and (ii) the target quantization parameter value for the training video frame. The system can determine the update by determining a gradient of an objective function for each training example (e.g., using backpropagation) that measures the error, and applying the gradients (e.g., a function of the gradients, such as an average of the gradients) to update the current values of the model parameter of the rate control model using an appropriate gradient descent optimization technique, e.g., RMSprop or Adam. For example, the target quantization parameter value for each training video frame can be represented by a one-hot vector. The error between (i) the scores for the possible quantization parameter values generated for the training video frame and (ii) the target quantization parameter value for the training video frame can include, e.g., a cross-entropy error.

In one example, for each training video frame in each training example, the rate control model can generate an output that further includes an estimate of an amount of data required to represent an encoded representation of the training video frame (e.g., as described with reference to FIG. 3). The system can determine the update to the current values of the model parameters of the rate control model that is further based on an error between (i) the estimate of the amount of data required to represent the encoded representation of the video frame, and (ii) an actual amount of data required to represent the encoded representation of the video frame determined using the target quantization parameter value included in the training example. The system can determine the error for each training example as, $$L_{frame} = \sum_{t=1}^{T} \left(b_t - b_t^{actual}\right)^2, \tag{3}$$

where $L_{frame}$ represents the error, t indexes the training video frames, T represents the number of training video frames in the training example, $b_t$ represents the estimate of the amount of data for training video frame t, and $$b_t^{actual}$$

represents the actual amount of data for the training video frame t.

In another example, the system can determine the update to the current model parameters of the rate control model that is further based on an error between (i) a total of the estimates of the amount of data required to represent the encoded representations of the training video frames and (ii) a total amount of data required to represent the encoded representations of the training video frames (e.g., determined using the target quantization parameter values included in the training data for the training video frames). The system can determine the error for each training example as, $$L_{total\ frames} = \left(\left(\sum_{t=1}^{T} b_t\right) - b_t^{actual\ total}\right)^2, \tag{4}$$

where $L_{total\ frame}$ represents the error, t indexes the training video frames, T represents the number of training video frames in the training example, $b_t$ represents the estimate of the amount of data for training video frame t, and $$b_t^{actual\ total}$$

represents the total of the actual amount of data for the training video.

In another example, for each training video frame, the system can determine the update to the current model parameters of the rate control model that is based on the error between (i) the scores for the possible quantization parameter values generated for the training video frame and (ii) the target quantization parameter value for the training video frame (a "QP" error), the "frame" error of equation (3), and the "total frame" error of equation (4). The system can determine the update based on a linear combination of the errors as, $$L = L_{QP} + \beta_1 L_{frame} + \beta_2 L_{total\ frame}, \tag{5}$$

where L represents the linear combination, $L_{QP}$ represents the "QP" error, $L_{frame}$ represents the "frame" error, $L_{total\ frame}$ represents the "total frame" error, $\beta_1$ represents a weighting factor for the frame error (e.g., represented by a positive real number), and $\beta_2$ represents a weighting factor for the total frame error (e.g., represented by a positive real number).

For one or more of the training examples, the target quantization parameter values for the training video frames of the training example are generated by performing an optimization to determine quantization parameter values for the training video frames. The optimization can minimize an error between (i) the training video frames and (ii) reconstructions of the training video frames that are determined by processing encoded representations of the training video frames that are generated using the quantization parameter values. The optimization can be, e.g., a constrained optimization subject to a constraint that a total amount of data required to represent encoded representations of the training video frames that are generated using the quantization parameter values be less than a target amount of data for representing the encoded representations of the training video frames. The system can perform the optimization using any appropriate optimization technique, e.g., a black box optimization technique, e.g., the optimization technique described with reference to: Tim Salimans, et al., "Evolution strategies as a scalable alternative to reinforcement learning". arXiv:1703.03864, 7 Sep. 2017, which is incorporated herein by reference, or Daniel Golovin, et al., "Google Vizier: A Service for Black Box Optimization", Proceedings of the 23rd ACM SIGKDD International Conference on Knowledge discovery and Data Mining, 13-17 Aug. 2017, which is incorporated herein by reference. The objective function to be optimized can be given by, e.g., for each training video:

$$\text{Objective Function} = PSNR - \lambda\max(0, b - b^{target}), \quad (6)$$

where PSNR represents the peak-signal-to-noise ratio (e.g., in the reconstruction), $\lambda$ represents a constant that introduces a penalty term when the amount of data exceeds the target amount of data (e.g., represented by a positive real number), b represents the amount of data to represent the encoded representations of the training video frames generated using the quantization parameter values, and $b^{target}$ represents the target amount of data for representing the encoded representations of the training video frames.

In practice, performing an optimization to determine quantization parameter values each time a video is compressed is computationally infeasible. In contrast, generating quantization parameter values using a rate control machine learning model that has been trained to imitate the results of optimizations performed to determine optimal or near optimal quantization parameter values can be significantly faster and consume fewer computational resources.

The training examples used to train the rate control machine learning model using the steps (602)-(608) can represent different strategies for encoding the training videos in the training examples that lead to differing quantization parameter sequences with similar performance metrics. Training the rate control machine learning model with training examples generated with varying strategies can create a learnability problem for the rate control machine learning model that leads to meeting the target amount for the compressed representation of a video only a fraction of the time. To make the training data more coherent and improve target data amount performance, the system can use the trained rate control machine learning model to generate a second set of training examples, as described below with reference to FIG. 7.

Figure 7:
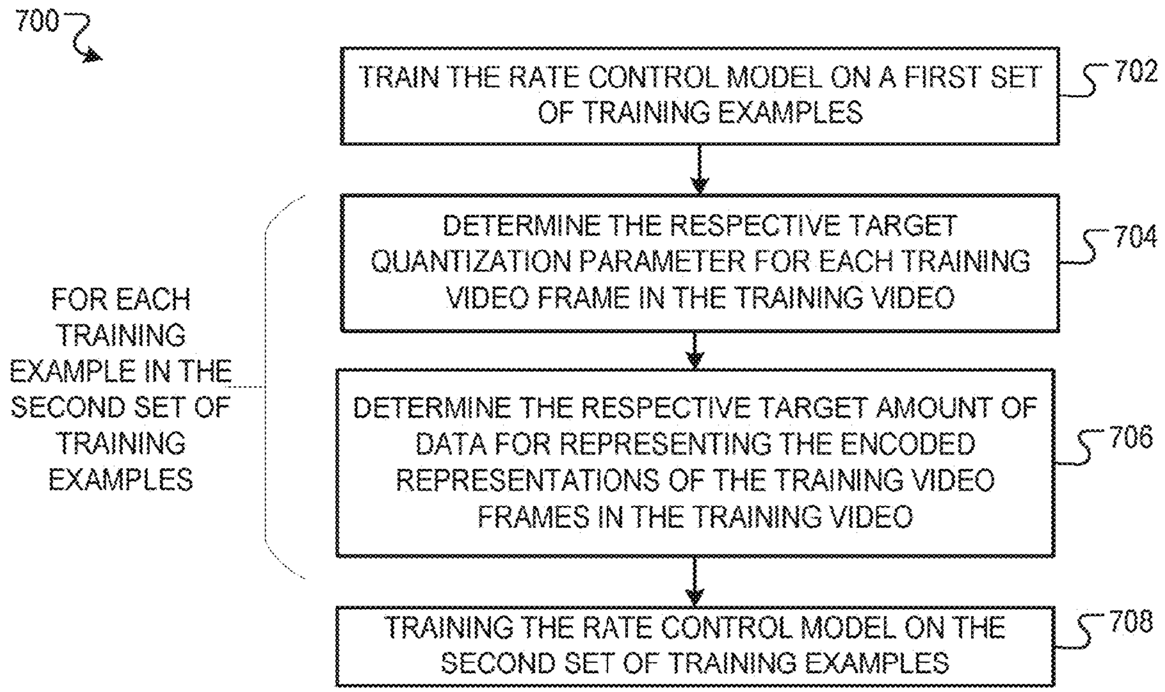
FIG. 7 is a flow diagram of an example process for determining a second set of training examples for training a rate control machine learning model.

FIG. 7 is a flow diagram of an example process for determining a second set of training examples. For convenience, the process 700 will be described as being performed by a system of one or more computers located in one or more locations.

The system can train the rate control model on a first set of training examples (702). For example, the system can train the rate control model on the first set of training examples as described above with respect to FIG. 6.

For each training example in the second set of training examples, the system determines the respective target quantization parameter for each training video frame (704) in the training video. The system can determine the respective target quantization parameter values by processing the training video frames using the rate control machine learning model. For example, for each training example, the system can process each training video frame in the training example to select a quantization parameter value for the training video frame, as described in FIG. 5. The system can determine the target quantization parameter value each training video frame in the second set of training examples as the selected quantization parameter value for the training video frame.

For each training example in the second set of training examples, the system determines the respective target amount of data for representing the encoded representations of the training video frames in the training video (706). The system can determine the respective target amount for representing a training video, e.g., as the sum of the respective amount of data required to represent each video frame in the training video if the video frame were encoded using the target quantization parameter value for the video frame (i.e., that is selected using the rate control model in step 704).

The system trains the rate control model on the second set of training examples (708). For example, the system can train the rate control model on the second set of training examples as described in FIG. 6.

Training the rate control machine learning model using the second set of training examples can enable the rate control machine learning model to learn a more coherent encoding strategy. Learning a more coherent encoding strategy can enable the rate control machine learning model to perform more consistently across a wide variety of videos by meeting the target data amounts for the compressed representations of the videos a higher percentage of the time.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more data processing apparatus for encoding a video comprising a sequence of video frames to generate a respective encoded representation of each video frame, the method comprising:

for each video frame:

obtaining a feature embedding for the video frame;

processing an input comprising the feature embedding for the video frame using a rate control machine learning model to generate a respective score for each of a plurality of possible quantization parameter values;

selecting a quantization parameter value from the plurality of possible quantization parameter values using the scores; and processing the video frame using an encoding model, in accordance with a quantization step size associated with the selected quantization parameter value, to generate the encoded representation of the video frame;

wherein the rate control machine learning model has a plurality of model parameters that are trained on a set of training examples, wherein each training example comprises data defining: (i) a respective feature embedding for each training video frame of a training video, and (ii) a respective target quantization parameter value for each training video frame.

2. The method of claim 1, wherein for each video frame, the input processed by the rate control machine learning model further comprises a target amount of data for representing the encoded video.

3. The method of claim 1, wherein training the rate control machine learning model on the set of training examples comprises, for each training example:

processing an input comprising the respective feature embedding for each training video frame using the rate control machine learning model to generate, for each training video frame, a respective score for each of the plurality of possible quantization parameter values; and determining an update to current values of the model parameters of the rate control machine learning model based on, for each training video frame, an error between: (i) the scores for the plurality of possible quantization parameter values generated for the training video frame, and (ii) the target quantization parameter value for the training video frame.

4. The method of claim 3, wherein the error between: (i) the scores for the plurality of possible quantization parameter values generated for the training video frame, and (ii) the target quantization parameter value for the training video frame, comprises a cross- entropy error.

5. The method of claim 3, wherein for each training video frame, the rate control machine learning model generates an output that further comprises an estimate of an amount of data required to represent an encoded representation of the training video frame.

6. The method of claim 5, further comprising determining an update to the current values of the model parameters of the rate control machine learning model based on, for each training video frame, an error between: (i) the estimate of the amount of data required to represent the encoded representation of the video frame, and (ii) an actual amount of data required to represent the encoded representation of the video frame.

7. The method of claim 5, further comprising determining an update to the current values of the model parameters of the rate control machine learning model based on an error between: (i) a total of the estimates of the amount of data required to represent the encoded representations of the training video frames, and (ii) a total amount of data required to represent the encoded representations of the training video frames.

8. The method of claim 1, wherein for one or more of the training examples, the target quantization parameter values for the training video frames of the training example are generated by performing an optimization to determine quantization parameter values for the training video frames that minimize a measure of error between: (i) the training video frames, and (ii) reconstructions of the training video frames that are determined by processing encoded representations of the training video frames that are generated using the quantization parameter values.

9. The method of claim 8, wherein the optimization is a constrained optimization subject to a constraint that a total amount of data required to represent encoded representations of the training video frames that are generated using the quantization parameter values be less than a target amount of data for representing the encoded representations of the training video frames.

10. The method of claim 1, wherein each training example further comprises data defining a target amount of data for representing the encoded representations of the training video frames in the training video.

11. The method of claim 10, wherein training the rate control machine learning model comprises:

training the rate control machine learning model on a first set of training examples;

generating a second set of training examples using the rate control machine learning model, wherein for each training example in the second set of training examples:

the respective target quantization parameter value for each training video frame is determined in accordance with current values of the model parameters of the rate control machine learning model; and the target amount of data for representing the encoded representations of the training video frames in the training video is an amount of data required to represent the encoded representations of the training video frames if each training video frame is encoded using the target quantization parameter value for the training video frame; and training the rate control machine learning model on the second set of training examples.

12. A system comprising:

one or more computers; and one or more storage devices communicatively coupled to the one or more computers, wherein the one or more storage devices store instructions that, when executed by the one or more computers, cause the one or more computers to perform operations for encoding a video comprising a sequence of video frames to generate a respective encoded representation of each video frame, the operations comprising:

for each video frame:

obtaining a feature embedding for the video frame;

processing an input comprising the feature embedding for the video frame using a rate control machine learning model to generate a respective score for each of a plurality of possible quantization parameter values;

selecting a quantization parameter value from the plurality of possible quantization parameter values using the scores; and processing the video frame using an encoding model, in accordance with a quantization step size associated with the selected quantization parameter value, to generate the encoded representation of the video frame;

wherein the rate control machine learning model has a plurality of model parameters that are trained on a set of training examples, wherein each training example comprises data defining: (i) a respective feature embedding for each training video frame of a training video, and (ii) a respective target quantization parameter value for each training video frame.

13. One or more non-transitory computer storage media storing instructions that when executed by one or more computers cause the one or more computers to perform operations for encoding a video comprising a sequence of video frames to generate a respective encoded representation of each video frame, the operations comprising:

for each video frame:

obtaining a feature embedding for the video frame;

processing an input comprising the feature embedding for the video frame using a rate control machine learning model to generate a respective score for each of a plurality of possible quantization parameter values;

selecting a quantization parameter value from the plurality of possible quantization parameter values using the scores; and processing the video frame using an encoding model, in accordance with a quantization step size associated with the selected quantization parameter value, to generate the encoded representation of the video frame;

wherein the rate control machine learning model has a plurality of model parameters that are trained on a set of training examples, wherein each training example comprises data defining: (i) a respective feature embedding for each training video frame of a training video, and (ii) a respective target quantization parameter value for each training video frame.

14. The one or more non-transitory computer storage media of claim 13, wherein for each video frame, the input processed by the rate control machine learning model further comprises a target amount of data for representing the encoded video.

15. The one or more non-transitory computer storage media of claim 13, wherein training the rate control machine learning model on the set of training examples comprises, for each training example:

processing an input comprising the respective feature embedding for each training video frame using the rate control machine learning model to generate, for each training video frame, a respective score for each of the plurality of possible quantization parameter values; and determining an update to current values of the model parameters of the rate control machine learning model based on, for each training video frame, an error between: (i) the scores for the plurality of possible quantization parameter values generated for the training video frame, and (ii) the target quantization parameter value for the training video frame.

16. The one or more non-transitory computer storage media of claim 15, wherein the error between: (i) the scores for the plurality of possible quantization parameter values generated for the training video frame, and (ii) the target quantization parameter value for the training video frame, comprises a cross-entropy error.

17. The one or more non-transitory computer storage media of claim 15, wherein for each training video frame, the rate control machine learning model generates an output that further comprises an estimate of an amount of data required to represent an encoded representation of the training video frame.

18. The one or more non-transitory computer storage media of claim 17, further comprising determining an update to the current values of the model parameters of the rate control machine learning model based on, for each training video frame, an error between: (i) the estimate of the amount of data required to represent the encoded representation of the video frame, and (ii) an actual amount of data required to represent the encoded representation of the video frame.

19. The one or more non-transitory computer storage media of claim 17, further comprising determining an update to the current values of the model parameters of the rate control machine learning model based on an error between: (i) a total of the estimates of the amount of data required to represent the encoded representations of the training video frames, and (ii) a total amount of data required to represent the encoded representations of the training video frames.

20. The one or more non-transitory computer storage media of claim 13, wherein for one or more of the training examples, the target quantization parameter values for the training video frames of the training example are generated by performing an optimization to determine quantization parameter values for the training video frames that minimize a measure of error between: (i) the training video frames, and (ii) reconstructions of the training video frames that are determined by processing encoded representations of the training video frames that are generated using the quantization parameter values.

* * * * *